United States Patent Office 2,768,001
Patented Oct. 23, 1956

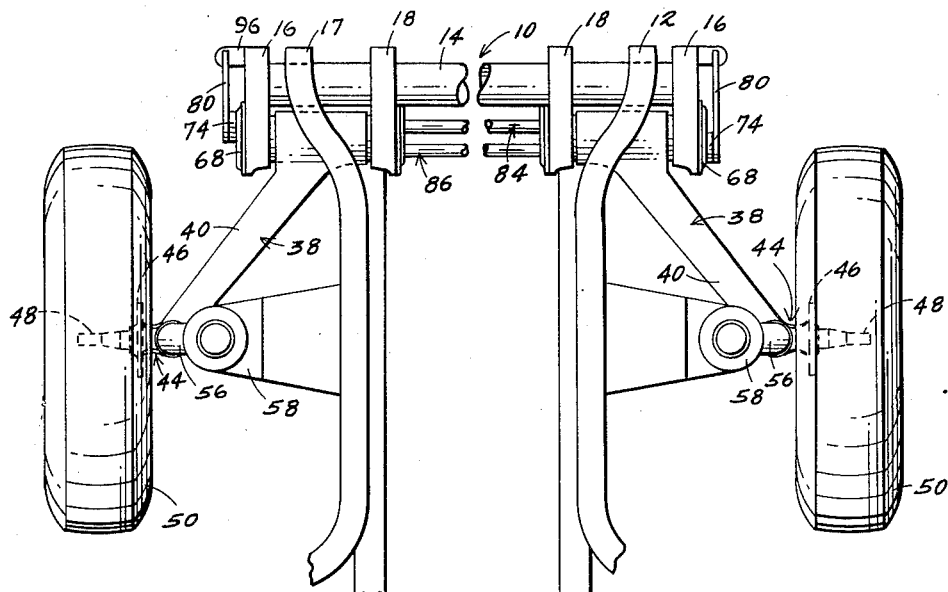

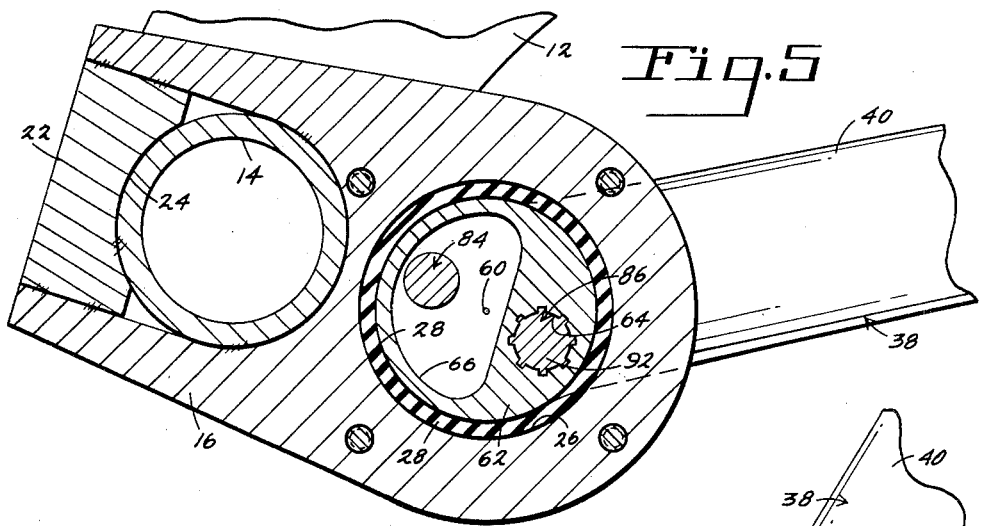
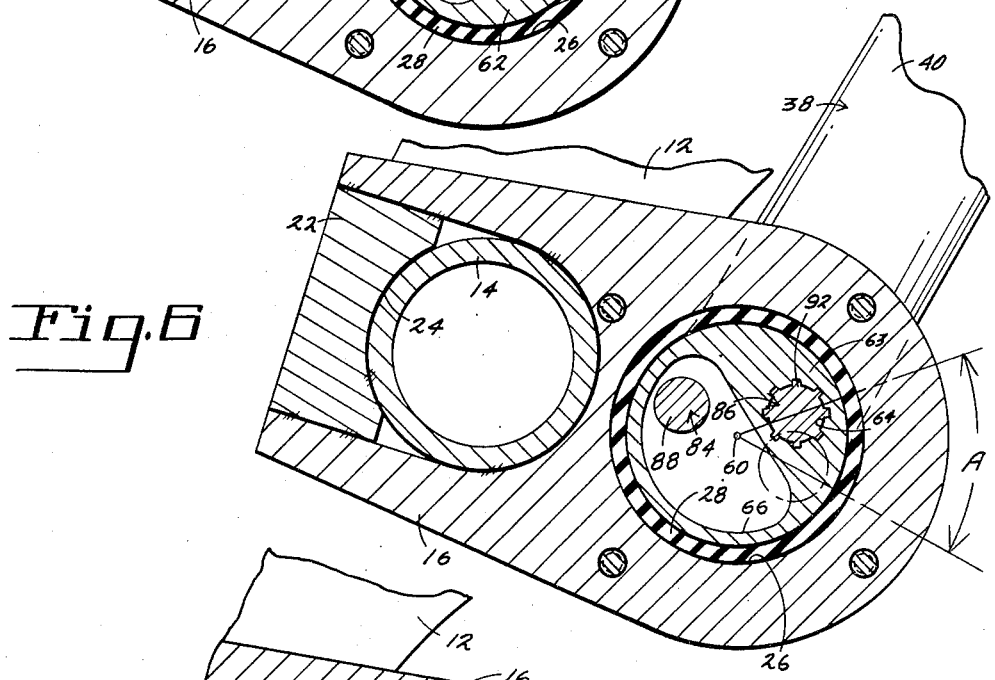
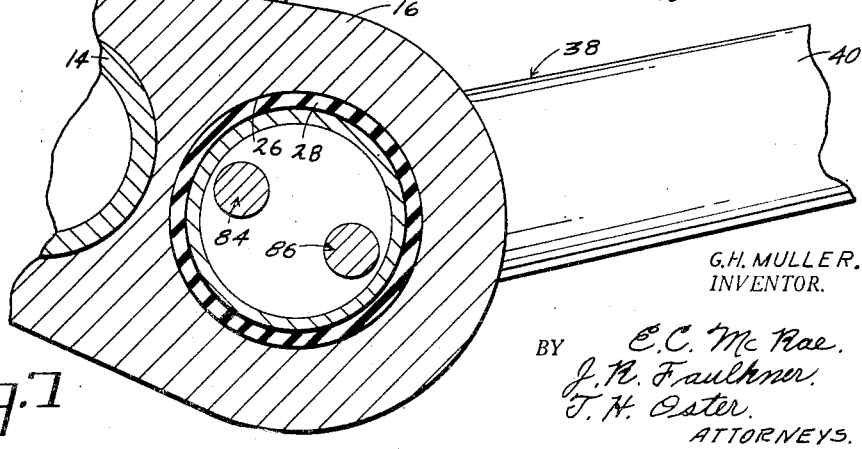

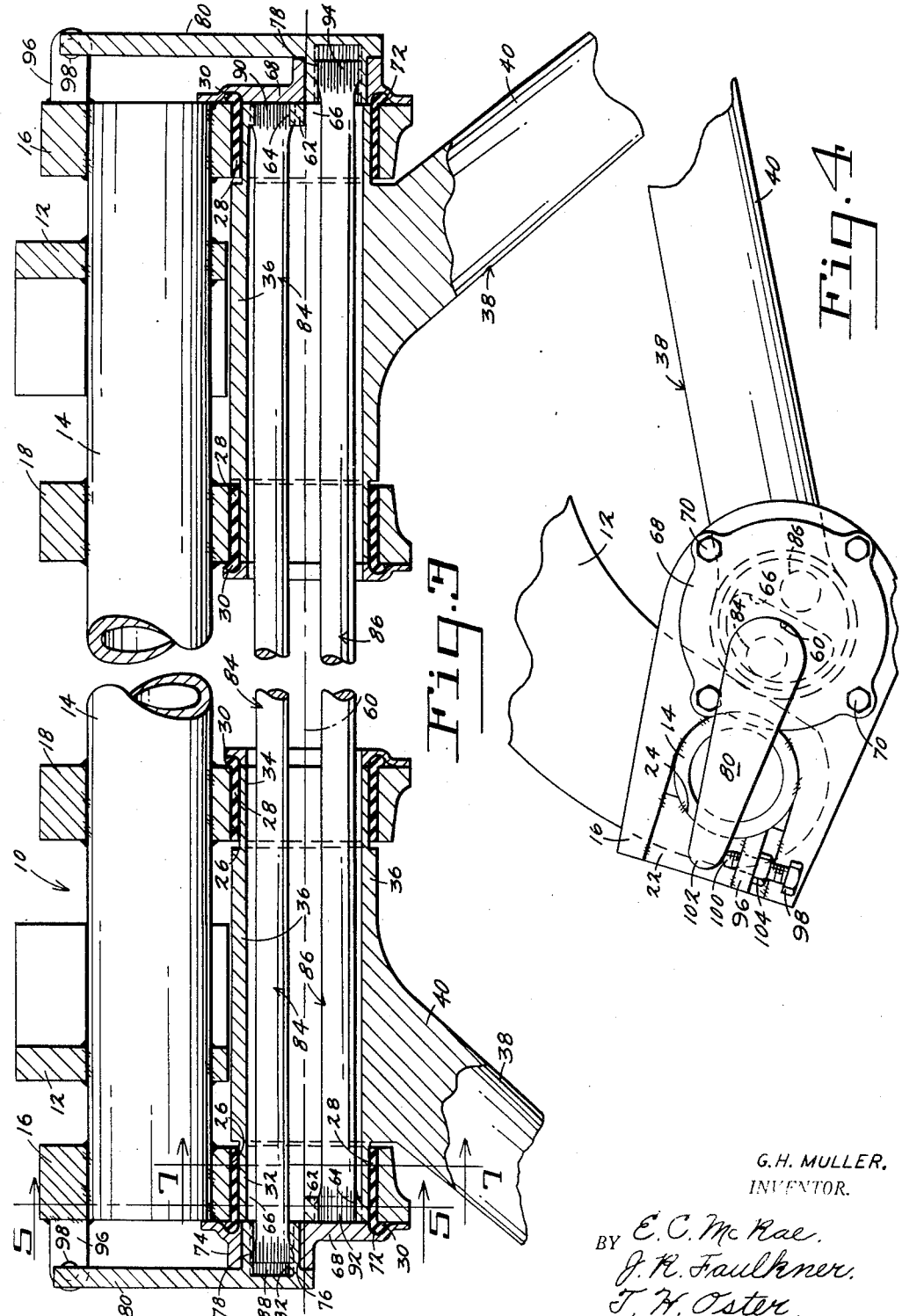

2,768,001

TORSION BAR FRONT SUSPENSION

George H. Muller, Northville, Mich., assignor to Ford Motor Company, Dearborn, Mich., a corporation of Delaware Application February 7, 1955, Serial No. 486,496

7 Claims. (Cl. 280—124)

This invention relates generally to an independent wheel suspension for a motor vehicle, and has particular reference to an independent suspension for the front wheels of a motor vehicle incorporating a pair of torsion bars.

In an embodiment of the present invention a trailing suspension arm is provided for each of the front road wheels, being pivotally mounted upon the vehicle frame for rotation about a common transverse horizontal axis. The hubs for the suspension arms are hollow and accommodate a pair of transversely extending parallel torsion bars extending completely across the vehicle frame and through the hubs of the suspension arms on opposite sides thereof. The torsion bars are each radially offset with respect to the axis of the suspension arms, and are arranged so that one end of each bar is anchored to the frame while the opposite end thereof is connected to the adjacent suspension arm for rotation therewith as a unit. Due to the offset relationship of each torsion bar rising and falling movement of a front road wheel results in orbital movement of the end of the torsion bar connected to the adjacent suspension arm, thus producing a torsional stress in the bar and forming a spring suspension for the adjacent road wheel. The entire suspension is extremely compact, and means are provided for readily adjusting the riding height of each of the front road wheels by changing the angular position of the anchored end of the associated torsion bar.

Other objects of the invention will be made more apparent as this description proceeds, particularly when considered in connection with the accompanying drawings, wherein:

Figure 1 is a plan view, partly broken away, of the forward portion of a motor vehicle chassis incorporating the present invention.

Figure 2 is a side elevation of the construction shown in Figure 1.

Figure 3 is an enlarged cross sectional view on the plane indicated by the line 3—3 of Figure 2.

Figure 4 is an enlarged end elevation of a portion of the construction shown in Figure 2.

Figure 5 is an enlarged cross sectional view taken on the plane indicated by the line 5—5 of Figure 3, with the parts of the construction shown in their normal positions.

Figure 6 is a cross sectional view similar to Figure 5, but illustrating the parts thereof in a different position.

Figure 7 is an enlarged cross sectional view taken on the plane indicated by the line 7—7 of Figure 3.

Referring now to the drawings, the reference character 10 indicates generally the forward portion of a motor vehicle chassis having a pair of generally longitudinally extending side frame rails 12 interconnected by a tubular cross frame member 14.

At each side of the vehicle a pair of frame brackets 16 and 18 are provided. Each of the frame brackets 16 and 18 is formed with a semicircular opening embracing the tubular cross frame member 14. An end cap 22 having an arcuate inner surface 24 embraces the opposite side of the tubular cross frame member 14 and assists in holding the frame brackets 16 and 18 in rigid assembled relationship to the tubular cross frame member. A rigid assembly may be completed by welding the frame brackets and end cap to each other and to the tubular cross frame member.

Each of the frame brackets 16 and 18 extends rearwardly from the tubular cross frame member 14, being inclined slightly downwardly, and is formed adjacent its rearward end with transversely aligned cylindrical bores 26. Rubber bushings 28 having enlarged end flanges 30 are received within the bores 26 in the frame brackets 16 and 18, and in turn receive and journal the opposite reduced end portions 32 and 34 of the sleeve-like hub 36 of a suspension arm 38.

Each suspension arm 38 has integrally formed with the hub 36 thereof a trailing arm portion 40. The trailing arm portion 40 extends generally rearwardly from its hub, being inclined slightly upwardly in side elevation. At its rearward end the trailing arm portion 40 of each suspension arm 38 is universally connected by means of a ball joint 42 to a wheel spindle 44.

Each wheel spindle 44 has a generally vertical flange 46 adapted to mount a brake backing plate. The wheel spindle 44 is also formed with a portion 48 for conventionally mounting a vehicle wheel 50 thereon. In addition, the spindle 44 is formed with an integral upper flange 52 provided with a cylindrical bore 54 for receiving the lower end of a tubular shock absorber strut 56, the upper end of which is pivotally connected to a structural frame member 58.

The suspension arm 38 and the tubular shock absorber 56 cooperate to support and guide the road wheel 50 during its rising and falling movements relative to the vehicle frame.

It will be seen that the hubs 36 of the suspension arms 38 at the opposite sides of the vehicle frame are arranged in transverse horizontal alignment for rotation about a common axis 60. At its outboard end each suspension arm hub 36 is formed with an integral radially extending end flange 62. At one side the end flange 62 is formed with a splined hole 64, and at its opposite side with an elongated generally semicircular opening 66, for a purpose to be described more in detail hereinafter. It will be noted that the end flanges 62 of the suspension arm hubs at opposite sides of the vehicle are reversed with respect to each other, with the splined hole 64 in each end flange being transversely and horizontally aligned with the semicircular opening 66 in the end flange at the opposite side of the vehicle.

A cover plate 68 is bolted to the outboard side of the frame brackets 16 at each side of the vehicle, with the inner face of the cover plate 68 being adjacent the end flange 62 of the adjacent suspension arm 38. Bolts 70 secure the cover plate to the frame bracket, and an annular groove 72 is formed in each cover plate to accommodate the enlarged end flange 30 of the rubber bushing 28 carried by the adjacent frame bracket 16.

Each cover plate 68 is formed with an enlarged outwardly projecting tubular boss 74 radially offset from the axis 60 of the suspension arms. The bosses 74 of the cover plates 68 at opposite sides of the vehicle are reversed with respect to each other, with the bosses being aligned with the central portion of the enlarged semicircular opening 66 in the adjacent end flange 62 of the suspension arm hub. Each cover plate boss 74 is formed with a central bore 76 which rotatably receives a bushing 78 formed integrally upon the inner end of a lever arm 80. Each bushing 78 is internally splined at 82.

A pair of torsion bars 84 and 86 extend transversely of the vehicle and parallel to each other. The opposite ends of the torsion bars extend into the sleeves 36 of the suspension arms 38 at opposite sides of the vehicle, and each of the bars is offset radially with respect to the common axis 60 of the suspension arms. In the present instance the torsion bar 84 is offset forwardly with respect to the axis 60 while the torsion bar 86 is offset rearwardly with respect to the axis. The torsion bars could, however, be arranged in different angular relationship within the suspension arm hubs, but at least one end of each bar should be offset with respect to the axis of the adjacent suspension arm.

As best seen in Figure 3, the left end 88 of the front torsion bar 84 is externally splined and nonrotatably received within the splined hole 82 formed in the bushing 78 carried by the cover plate 68. The opposite or right hand end 90 of the bar 84 is also externally splined and is anchored within the splined hole 64 formed in the end flange 62 of the adjacent suspension arm hub 36.

The rear torsion bar 86 is similarly connected, but is reversed with respect to the front torsion bar 84. Its left hand end 92 is externally splined and is anchored within the splined hole 64 formed in the end flange of the adjacent suspension arm hub while its right hand end 94 is externally splined and nonrotatably received within the bushing 78 carried by the cover plate 68.

Referring particularly to Figures 2 and 4, means are provided for adjustably positioning and anchoring the lever arm 80 which is integrally formed with the bushing 78 journaled in the cover plate 68 at each side of the vehicle frame. A flange 96 projects outwardly from the outboard frame bracket 16 at each side of the vehicle and threadedly receives an adjusting bolt 98 having a rounded inner end 100 bearing against the marginal end portion 102 of the lever 80. A lock nut 104 locks the adjusting bolt 98 in its adjusted position.

It will be apparent from the foregoing that each of the torsion bars 84 and 86 is anchored at one end to the vehicle frame through the splined end connection with the bushing 78. The lever arm 80 integrally formed with the bushing 78 and the adjustable bolt 98 provide means for adjusting the angular position of the anchored end of each torsion bar to vary the normal riding height of the vehicle and to permit adjustment of each torsion bar to provide equal and predetermined riding positions for each suspension arm.

While the ends 88 and 94 of the torsion bars 84 and 86 respectively are anchored to the frame, the opposite ends 90 and 92 of the torsion bars are nonrotatably connected to the end flanges 62 of the suspension arm hubs 36. The last mentioned ends of the torsion bars are thus connected to the suspension arms at points offset radially with respect to the common axis 60 of the suspension arms. Consequently, when either of the road wheels 50 rises or falls relative to the vehicle frame the torsion bar end 90 or 92 which is connected to the suspension arm hub is moved in an orbital path about the axis 60 of the suspension arm. Since the opposite end of each torsion bar is anchored to the frame this results in a combined bending and twisting of the bar. As seen in Figures 5 and 6, the end 92 of the torsion bar 86 is moved from the normal position shown in Figure 5 through an angle A to the position shown in Figure 6 when the adjacent suspension arm 38 is raised as shown. The torsion bars 84 and 86 thus form independent spring suspensions for the front road wheels 50.

As will be seen particulary in Figure 6, the enlarged semicircular opening 66 in the end flange 62 of the suspension arm hub 36 provides clearance for the adjacent anchored end 88 of the other torsion bar 84.

Each torsion bar may operate independently and simultaneously, depending upon the movement of the associated suspension arm. Although the torsion bars are shown here as being parallel to each other and to the axis 60 of the suspension arms, this arrangement can be varied as long as the end of each torsion bar which is connected to the end flange of the adjacent suspension arm is offset with respect to the axis of the suspension arms so that upon rising and falling movement of the associated road wheel it will travel in an orbital path about the axis of the suspension arms and will produce torsional stress in the bar.

It will be understood that the invention is not to be limited to the exact construction shown and described, but that various changes and modifications may be made without departing from the spirit and scope of the invention, as defined in the appended claims.

What is claimed is:

1. In an independent wheel suspension for the front road wheels of a motor vehicle, a frame, a pair of suspension arms having hollow sleeve-like hubs journaled for rotation about a common transversely extending horizontal axis, said suspension arms having trailing arm portions formed integrally with said hubs and extending generally rearwardly therefrom and connected at their rearward ends to said road wheels, a pair of generally parallel torsion bars extending transversely of said vehicle and having their opposite ends extending through the sleeve-like hubs of said suspension arms, means anchoring one end of each of said torsion bars to the vehicle frame with the anchored ends of said bars being at opposite sides of the vehicle, means securing the opposite end of each of said torsion bars to one of said suspension arms with the connections between said opposite ends and said suspension arms being offset radially from the axis of said suspension arms so that rising and falling movement of said road wheels relative to said frame moves the connections between said torsion bars and said suspension arms in orbital paths to torsionally stress said bars.

2. In an independent wheel suspension for the front road wheels of a motor vehicle, a frame, a pair of suspension arms having hollow sleeve-like hubs pivotally mounted for rotation about a common transversely extending horizontal axis, said suspension arms having trailing arm portions formed integrally with said hubs and extending generally rearwardly therefrom and connected at their rearward ends to said road wheels, a pair of torsion bars extending generally transversely of said vehicle and having their opposite ends extending into the hollow hubs of said suspension arms, each end portion of each of said torsion bars being offset radially from the axis of said suspension arms, means anchoring one end of each of said torsion bars to said frame at opposite sides of the vehicle, and means connecting the other end of each of said torsion bars to the adjacent suspension arm to produce an orbital movement of the end of each torsion bar connected to the adjacent suspension arm as that suspension arm and the road wheel connected thereto rises and falls relative to the vehicle frame to torsionally stress the bar.

3. The structure defined by claim 2 which is further characterized in that torsion bars are parallel and are spaced equal distances on opposite side of the common axis of said suspension arms.

4. The structure defined by claim 2 which is further characterized in that a bracket is secured to the vehicle frame adjacent the outboard side of each of said suspension arm hubs and anchors one end of one of said torsion bars, each of said suspension arm hubs having an integral generally radially inwardly extending flange formed at the outboard end thereof, the other end of each of said torsion bars being connected to said last mentioned flange for movement with the suspension arm as the road wheel connected thereto rises and falls.

5. In an independent wheel suspension for the front road wheels of a motor vehicle, a pair of generally longitudinally extending side frame rails, a transversely extending cross frame member connected to said side rails, a pair of frame brackets at each side of said vehicle secured to said cross member, transversely aligned openings formed in said frame brackets, a sleeve extending through the aligned openings in each pair of frame brackets and journaled therein, a trailing suspension arm extending rearwardly from each of said sleeves and connected at its rearward end to one of said road wheels, a cover bracket secured to one of said pair of frame brackets adjacent the outboard end of each of said sleeves, an end flange carried by each of said sleeves adjacent its outboard end, a pair of parallel torsion bars extending transversely of said vehicle through said sleeves, each of said torsion bars being offset radially from the transverse axis of said sleeves, means anchoring one end of each of said torsion bars to the adjacent frame bracket, means anchoring the opposite end of each of said torsion bars to the end flange of the adjacent sleeve for orbital movement about the axis of said sleeve upon rising and falling movement of the adjacent road wheel.

6. The structure defined by claim 5 which is further characterized in that each of said cover brackets has a bushing journaled therein in radially offset relationship to the axis of the adjacent suspension arm sleeve, a lever arm secured to said bushing, adjusting means on said frame for adjusting the angular position of said lever arm and bushing, and said bushing being splined to receive and anchor the adjacent end of one of said torsion bars.

7. In an independent wheel suspension for the front road wheels of a motor vehicle, a pair of generally longitudinally extending frame side rails, a tubular cross frame member secured to said side rails, a pair of frame brackets at each side of said vehicle embracing and secured to said tubular cross frame member and extending rearwardly therefrom, transversely aligned bores formed in said frame brackets adjacent their rearward ends, a trailing suspension arm at each side of the vehicle connected at its rearward end to the adjacent road wheel and having a transversely extending sleeve integrally formed at its forward end with the ends of the sleeve projecting into the aligned bores in the frame brackets, rubber bushings between the ends of said sleeve and the frame brackets to journal the suspension arm therein, a cover bracket secured to the outboard frame bracket at each side of the vehicle and enclosing the adjacent end of the adjacent suspension arm sleeve, a bushing journaled in each of said cover plates with the bushing in one cover plate being offset radially forwardly of the axis of the suspension arms and the bushing in the cover plate at the opposite side of the vehicle being offset radially rearwardly from said axis, an integral radially inwardly projecting flange formed at the outboard end of each said suspension arm sleeves, said end flanges each having a splined hole formed therein on the opposite side of the axis of said suspension arms from the bushing in the adjacent cover plate and also having an elongated slot formed therein overlapping the bushing, a pair of parallel torsion bars extending transversely of the vehicle with their opposite ends extending into said suspension arm sleeves, one end of each of said torsion bars being splined and received within the splined hole in the end flange of the adjacent suspension arm sleeve, the opposite end of each of said torsion bars extending through the elongated slot in the end flange of the adjacent suspension arm sleeve and nonrotatably secured to the bushing in the adjacent cover plate, means anchoring each of said bushings to said frame so that rising and falling movement of either of said road wheels rotates the connected suspension arm about its axis and produces an orbital movement of the end of the torsion bar connected to the end flange of that suspension arm to torsionally stress said bar.

References Cited in the file of this patent

UNITED STATES PATENTS 2,033,493     Straussler _____ Mar. 10, 1936

FOREIGN PATENTS 907,149     Germany _____ Mar. 22, 1954